United States Patent [19]

Mielke et al.

[11] Patent Number: 4,703,704
[45] Date of Patent: Nov. 3, 1987

[54] APPARATUS FOR TRANSPORTING SEEDS TO LOCALES OF GERMINATION

[75] Inventors: Johannes Mielke, Reinbek; Alfred Sebelin, Hamburg, both of Fed. Rep. of Germany

[73] Assignee: Hauni-Werke Körber & Co. KG., Hamburg, Fed. Rep. of Germany

[21] Appl. No.: 821,494

[22] Filed: Jan. 23, 1986

[30] Foreign Application Priority Data

Feb. 1, 1985 [DE] Fed. Rep. of Germany ....... 3503333

[51] Int. Cl.⁴ .............................................. A01C 7/04
[52] U.S. Cl. ...................................... 111/1; 221/211; 47/1 A
[58] Field of Search ................. 47/1 A; 111/1, 77, 96, 111/91, 34, 52; 221/211

[56] References Cited

U.S. PATENT DOCUMENTS

| 17,258 | 5/1857 | Broughton | 111/96 |
| 2,505,758 | 5/1950 | Enebeck | 111/34 X |
| 3,156,201 | 11/1964 | Tweedale | 111/77 |
| 3,387,746 | 6/1968 | Whipple | 111/1 X |
| 3,542,242 | 11/1970 | Irvine | 111/34 X |
| 4,046,285 | 9/1977 | Wendt | 111/1 X |
| 4,106,414 | 8/1978 | Vastag | 111/1 |
| 4,145,980 | 3/1979 | Boots | 111/1 |
| 4,306,509 | 12/1981 | Hassan et al. | 111/77 X |
| 4,411,206 | 10/1983 | Hiscock | 111/91 X |
| 4,466,554 | 8/1984 | Hanacek et al. | 47/1 A |

FOREIGN PATENT DOCUMENTS

| EP10383 | 4/1980 | European Pat. Off. | 47/1 A |
| EP36215 | 9/1981 | European Pat. Off. | 111/1 |
| 950108 | 9/1949 | France | 111/96 |
| 209100 | 3/1968 | U.S.S.R. | 111/77 |
| 576984 | 10/1977 | U.S.S.R. | 111/77 |
| 784823 | 12/1980 | U.S.S.R. | 111/77 |
| 808026 | 2/1981 | U.S.S.R. | 221/211 |
| 880295 | 11/1981 | U.S.S.R. | 111/34 |
| 913971 | 3/1982 | U.S.S.R. | 111/52 |
| 917752 | 4/1982 | U.S.S.R. | 111/1 |

Primary Examiner—Robert A. Hafer
Assistant Examiner—Danton DeMille
Attorney, Agent, or Firm—Peter K. Kontler

[57] ABSTRACT

Apparatus for introducing discrete seeds or clusters of two or more seeds into each of an array of seed carrying devices at a seed inserting station has a rotary drum-shaped conveyor whose shell has rows of axially parallel suction ports. Such rows form several groups each containing ports of a particular size. The rows travel past a magazine which contains a supply of seeds and from which selected rows draw seeds which remain in the respective suction ports during transport to the inserting station. To this end, the selected rows are connected to a suction generating device by way of channels which are provided in the shell. The component which determines whether a single group or two or more groups of rows are to be connected with the suction generating device is a ring-shaped selector which is rotatable with reference to the shell and has two or more sets of openings which can be moved into or out of alignment with the channels in the shell. The conveyor can be turned relative to its drive shaft in order to select a particular single group of rows for transfer of seeds from the magazine to the inserting station.

21 Claims, 16 Drawing Figures

APPARATUS FOR TRANSPORTING SEEDS TO LOCALES OF GERMINATION

BACKGROUND OF THE INVENTION

The present invention relates to apparatus for manipulating granular or like materials, and more particularly to improvements in apparatus for transporting seeds from a source of supply to one or more locales of germination. Still more particularly, the invention relates to improvements in apparatus for transporting seeds from a magazine to a station where discrete seeds or clusters of two or more seeds each can be inserted into discrete seed carrying devices or into larger containers for fertilized soil, fibrous material or any other material wherein the seeds are caused or allowed to germinate and sprout.

The term "seeds" is intended to embrace all kinds of seeds regardless of their size and/or shape, i.e., the seeds may but need not resemble or constitute grains. The term "locales of germination" is also intended to be interpreted in its broadest sense so as to embrace containers or devices of the type disclosed, for example, in the commonly owned copending patent application Ser. Nos. 597,521 filed Apr. 6, 1984 and 767.183 filed Aug. 19, 1985. The latter application further discloses an apparatus for making discrete rod-shaped seed carrying devices and means for inserting seeds into such devices.

Commonly owned German patent application Ser. No. P 34 29 028.1 discloses an apparatus which is designed to withdraw discrete seeds from a primary magazine and to transport the thus singularized seeds into a second magazine for storage or directly to the locale or locales of germination. The apparatus comprises a drum-shaped conveyor whose shell is provided with rows of suction ports serving to attract individual seeds on their way from the primary magazine into the second magazine or to the locale or locales of germination. The arrangement is such that each suction port which advances past the primary magazine entrains a discrete seed, and these seeds are thereupon delivered to inserting devices which implant the seeds into soil or into a substitute for soil, or deposit the seeds in the second magazine. A drawback of such apparatus is their limited versatility, i.e., the apparatus cannot be readily used to reliably transport seeds having different sizes and/or to implant, or deliver for implantation, clusters of two or more seeds each.

OBJECTS AND SUMMARY OF THE INVENTION

An object of the invention is to provide a novel and improved apparatus whose versatility greatly exceeds that of heretofore known seed transporting and implanting apparatus.

Another object of the invention is to provide an apparatus which can selectively transport larger, smaller or medium-sized seeds with the same degree of reliability.

A further object of the invention is to provide an apparatus which can be rapidly converted from transport and implantation of individual seeds to transport and implantation of clusters of two or more seeds each, or vice versa.

An additional object of the invention is to provide the apparatus with a novel and improved seed transporting conveyor.

Still another object of the invention is to provide an apparatus which can be automatically or manually converted for the conveying of different types and sizes of seeds and/or for the conveying of individual seeds or clusters of seeds in a time saving operation.

Still another object of the invention is to provide the apparatus with novel and improved means for implanting individual seeds or clusters of two or more seeds each.

An additional object of the invention is to provide a novel and improved method of transporting individual seeds or clusters of two or more seeds each between a magazine and the locale of implantation of seeds into soil or into a substitute for soil.

A further object of the invention is to provide a method which can be used for the transport and other manipulation of small, medium-large or large seeds of practically any shape.

Another object of the invention is to provide an apparatus which can be used for mass implantation of seeds in large nurseries and similar establishments with substantial savings in time and labor.

The improved apparatus is used to transport seeds and comprises a rotary drum-shaped conveyor having a plurality of suction ports which serve to receive discrete seeds and to orbit along an endless path in response to rotation of the conveyor, a source of seeds (e.g., a stationary magazine) adjacent to a portion of the path, a fan or another suitable suction generating device, and means for connecting the suction generating device with selected ports so that only the selected ports attract seeds during travel past the source. The ports are preferably disposed in a plurality of rows, and such rows include at least two groups one of which has smaller and the other of which has larger ports. The rows of ports preferably extend in parallelism with the axis of rotation of the conveyor. The connecting means preferably includes means for connecting the suction generating device with the ports of a selected group (or with the ports of such selected group and at least one additional group) during each revolution of the conveyor. The rows of the aforementioned groups preferably form pairs of neighboring rows, and the connecting means can include means for simultaneously connecting the suction generating device with such pairs of neighboring rows (this enables the apparatus to admit clusters of two or more seeds into discrete seed carrying devices or into discrete portions of a larger receptacle for several single seeds or for several clusters of two or more seeds each).

The conveyor is preferably formed with channels each of which communicates with a row of ports, and the connecting means then includes means for establishing communication between the suction generating device and selected ones of the channels during each revolution of the conveyor (for example, the connecting means can be designed or adjusted to establish communication between the suction generating device and each fourth channel or between the suction generating device and alternating pairs of neighboring channels).

The connecting means is preferably adjacent to one axial end of the conveyor, and such connecting means can comprise a substantially ring-shaped selector having openings which are movable into and from positions of register with selected channels of the conveyor. The selector can be formed with several sets of openings and is preferably movable with reference to the conveyor between a first angular position in which the openings of one set register with channels that communicate with the ports of one group, and a second angular position in which the openings of two sets register with channels that communicate with the ports of two different groups. The connecting means can further comprise a ring-shaped member having a discrete opening for each channel that communicates with the ports of the two different groups, and such ring-shaped member is preferably interposed between the selector and the one axial end of the conveyor. The ring-shaped member is preferably coaxial with the selector and with the conveyor, and the selector is rotatable relative to the ring-shaped member between the aforementioned first and second positions. The ring-shaped member and the selector rotate with the conveyor.

The connecting means can further comprise a stationary valving element (e.g., a disc-shaped valve plate which is mounted on a stationary support of the frame of the improved apparatus) which is adjacent to the selector and has a groove which communicates with the suction generating device. The groove further communicates with the openings of at least one set of openings in the selector during a predetermined stage of each revolution of the conveyor and selector, namely when the selected rows of suction ports travel along the source of seeds and also during the subsequent portion of their travel to a second protion of the endless path where the suction ports are caused and/or permitted to discharge their seeds.

The means for transmitting torque to the conveyor as well as to the selector and to the ring-shaped member of the connecting means can comprise a shaft which is coaxial with the conveyor, a first coupling member which is affixed to the shaft, a second coupling member which is affixed to the other axial end of the conveyor, and means for separably securing the first and second coupling members to each other. Each coupling member can comprise or constitute a ring which is coaxial with the conveyor. The securing means can comprise screws and a retainer which mates with the shanks of the screws. The two coupling members are then clamped between the heads of the screws and the retainer. The coupling members can be separated from each other so as to allow for rotation of the conveyor relative to the shaft in order to select a particular group of rows of suction ports (e.g., a group of relatively large or a group of relatively small suction ports) as a means for picking up seeds during travel past the magazine and to discharge such seeds during travel along the second portion of the endless path. The just described coupling members in the form of rings can constitute but one suitable form of means for separably coupling the shaft (i.e., a component of the torque transmitting means) to the conveyor so as to enable the conveyor to change its angular position with reference to the shaft. It will be noted that the aforementioned connecting means including the selector and the ring-shaped member can be disposed at one axial end, and the coupling means between the conveyor and the torque transmitting means (such as the aforementioned shaft) can be disposed at the other axial end of the conveyor. This renders it possible to gain access to the connecting means and to the coupling means. The coupling means is preferably disengaged, or the force with which it couples the conveyor to the shaft is preferably relaxed, before the angular position of the selector is changed for the purpose of enabling a single group or several groups of rows of suction ports to gather seeds during travel past the source of seeds.

One or more coil springs or other suitable means can be provided to yieldably bias the conveyor axially against the connecting means during changes in angular position of the conveyor with reference to the torque transmitting means. This reduces the likelihood of penetration of dust and/or other contaminants into the interior of the conveyor while the angular position of the conveyor with reference to the shaft is being changed for the purpose of selecting suction ports of proper size for the transport of seeds from the source of seeds to the seed carrying devices.

The valving element can be provided with a first and a second outlet for compressed air which is supplied by a suitable source. A rotating sealing ring is preferably installed between the selector and the valving element and has openings in register with selected channels of the conveyor. One compressed air outlet of the valving element serves to admit compressed air into successive channels of the conveyor by way of the sealing ring, selector and ring-shaped member while the channels advance along the second portion of the endless path so that the streams of compressed air promote expulsion of seeds from the respective ports while the ports are located at the seed discharging station, i.e., at the station where the seeds are inserted into seed carrying devices or into another suitable body for germination and sprouting of seeds therein.

The other compressed air outlet of the valving element can be used to admit compressed air into successive channels (again via openings in the sealing ring, selector and ring-shaped member) downstream of the second portion but upstream of the first portion of the endless path so that the respective ports are cleaned before they reach the source of seeds.

The apparatus can further comprise means for transporting arrays of seed carrying devices to the second portion of the endless path, and means for inserting the discharged seeds into the seed carrying devices. The inserting means can comprise a discrete seed inserting unit for each port of a row, and each such unit can comprise a preferably upright sleeve-like tubular piercing member, an elongated strip-shaped carrier or other suitable means for forcibly introducing the piercing member into and for withdrawing it from a seed carrying device in the second portion of the endless path, a channel and a flexible conduit or other suitable means for admitting at least one seed into the piercing member so that the seed enters the respective seed carrying device, and a reciprocable plunger or other suitable means for retaining the thus inserted seed or seeds in the seed carrying device during extraction of the piercing member (i.e., the retaining means prevents the implanted seed or seeds from leaving the seed carrying device with the piercing member). The latter is preferably provided with a pointed lower end portion so as to facilitate its penetration into the seed carrying device therebelow. The inserting means preferably further comprises means (e.g., a camshaft) for reciprocating the retaining means relative to the respective piercing members. Each piercing member has an inlet for reception of one or more seeds from the aforementioned admitting means, and the retaining means (e.g., the aforementioned plungers) are preferably designed to block the introduction of seeds into the respective piercing members in predetermined positions of the retaining means relative to the corresponding piercing members.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
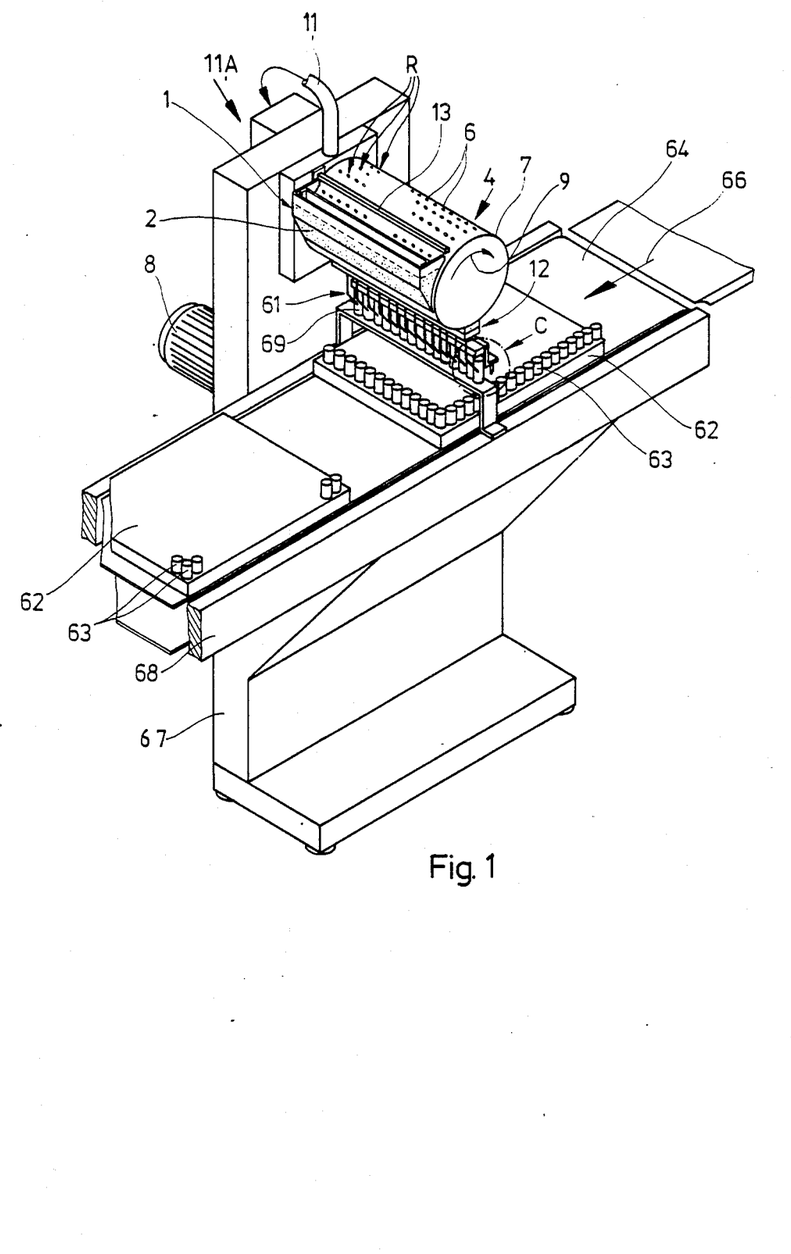
FIG. 1 is a perspective view of an apparatus which embodies the invention and is in the process of inserting seeds into rod-shaped seed carrying devices which are confined in trays.

FIG. 1 shows an apparatus which embodies the present invention and is designed to transport seeds 2 from a source 1 (e.g., a relatively small elongated horizontal magazine whose contents can be replenished from time to time or continuously) to a seed discharging station 12 where the seeds can enter discrete upright rod-like seed carrying devices 63 which are arrayed in trays 62, e.g., in a manner as disclosed in the aforementioned commonly owned patent application Ser. No. 597,521. An apparatus which is somewhat similar to the apparatus of the present invention is disclosed in the aforementioned commonly owned German patent application Ser. No. P 34 29 028.1.

The apparatus of FIG. 1 further comprises a rotary drum-shaped seed withdrawing conveyor 4 whose cylindrical shell 7 is formed with several rows R of axially parallel suction ports 6 serving to receive discrete seeds 2 during travel along that portion of their endless path which is adjacent to the open side of the magazine 1. The means for rotating the conveyor 4 about a substantially horizontal axis comprises a prime mover 8, e.g., a variable-speed electric motor which is mounted at the rear side of an upright column 67 forming part of the frame 68 of the improved apparatus. The direction in which the shell 7 rotates when the motor 8 is on is indicated by the arrow 9. Selected rows R of ports 6 in the shell 7 of the conveyor 4 can be connected to a suitable suction generating device 11A (e.g., a suction fan) by way of a suction intake 11 which is adjacent to one axial end of the conveyor 4. The suction generating device 11A is preferably driven by the prime mover 8 but it is equally possible to provide a discrete motor therefor. Those ports 6 of the shell 7 which communicate with the suction generating device 11A on their way past the magazine 1 and toward the seed discharging station 12 deliver discrete seeds 2 into the range of a row of discrete seed inserting devices or units 61 which can be of the type shown in FIG. 2. A refuser 13 (e.g., a brush or an elastic strip) is adjacent to the periphery of the shell 7 downstream of the magazine 1 (as considered in the direction of the arrow 9) to brush back the surplus of seeds 2, i.e., to ensure that each port 6 which is in communication with the suction generating device 11A carries a single seed 2. The refuser 13 extends in parallelism with the axis and all the way between the two axial ends of the shell 7.

The means for moving successive trays 62 stepwise past the seed discharging station 12 comprises an endless belt conveyor 64 which is driven to advance intermittently in the direction of the arrow 66. The upper reach of the conveyor 64 is supported by a portion of the frame 68 and this conveyor advances in synchronism with the rotating shell 7 so as to ensure that the seed carrying devices 63 of successive rows of such devices receive discrete seeds 2, or clusters containing selected numbers of seeds, depending upon the selected setting of the apparatus. The belt conveyor 64 can be replaced with two or more belt or chain conveyors without departing from the spirit of the invention. Furthermore, the trays 62 constitute but one form of receptacles which can be used to store arrays of seed carrying devices 63 on their way toward, past and beyond the seed discharging station 12.

The magazine 1 is adjacent to a first portion and the seed discharging station 12 is adjacent to a second portion of the endless path of orbital movement of successive rows R of suction ports 6 about the axis of the conveyor 4.

Figure 2:
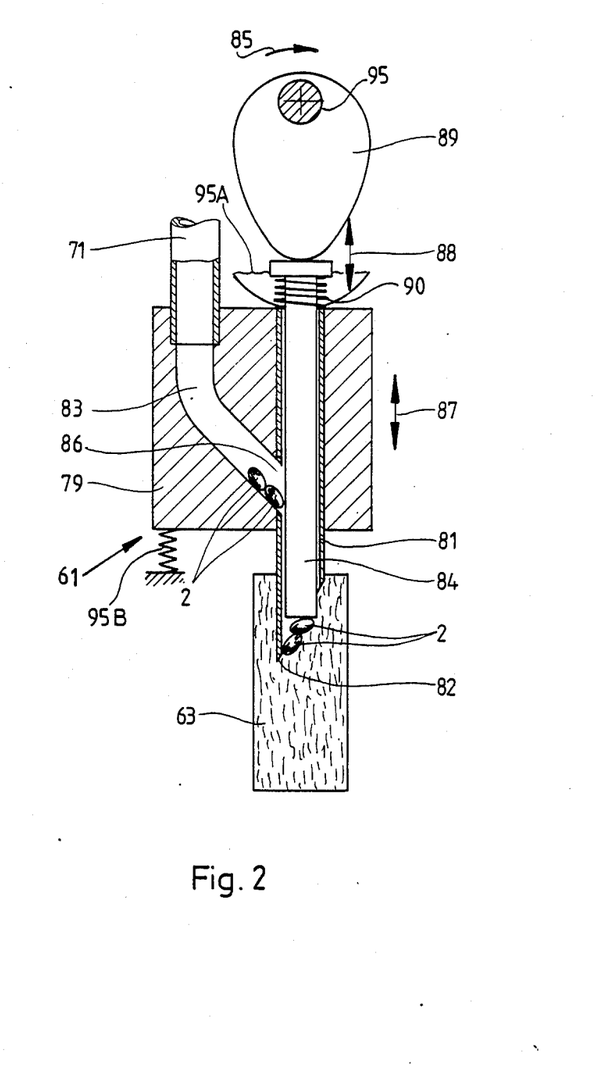
FIG. 2 is an enlarged vertical sectional view of a discrete seed inserting device which can be used in the apparatus of FIG. 1.

The details of one of a full battery or file of seed inserting devices or units 61 are shown in FIG. 2. An elongated strip-shaped carrier 79 serves to support the inserting devices 61 in the form of a file at the seed discharging station 12 in such a way that the upright tubular piercing member 81 (here shown as a cylindrical sleeve) of each inserting device or unit 61 is aligned with one seed carrying device 63 of the row of such seed carrying devices at the station 12 while the conveyor 64 is at a standstill between two successive movements in the direction of the arrow 66.

The sleeve 81 is fixedly secured to the carrier 79 and is movable therewith up and down as indicated by a double-headed arrow 87. The lower end portion 82 of the sleeve 81 is pointed for ready penetration into the (e.g., fibrous) material in the cylindrical envelope of the seed carrying device 63 therebelow. A retaining member in the form of a plunger 84 is provided in the sleeve 81 and is movable with respect thereto (and hence with respect to the carrier 79) in directions which are indicated by a double-headed arrow 88. A coil spring 90 biases the upper end portion of the plunger 84 against the peripheral surface of a rotary disc cam 89 which is driven to rotate in the direction of arrow 85.

The carrier 79 is formed with a discrete seed admitting channel 83 for each of the sleeves 81, and each sleeve 81 has an inlet 86 (this inlet is the outlet of the respective channel 83) which can receive one or more seeds 2 from a flexible conduit 71 connecting the upper end of the channel 83 with two or more suction ports 6 in the shell 7 of the conveyor 4 during several successive stages of each revolution of the conveyor 4 about its axis.

The plunger 84 not only serves to expel the seed or seeds 2 from the lower portion of the sleeve 81 and to drive the expelled seed or seeds into the material which fills the aligned seed carrying device 63 but also as a valving element which temporarily seals the inlet 86 from the channel 83 and conduit 71. Still further, the plunger 84 serves as a means for preventing the material which fills the envelope of the seed carrying device 63 from rising with the ascending sleeve 81 when the latter is caused to move upwardly with the carrier 79.

The means for reciprocating the retaining members or plungers 84 can include a first prime mover, and the means for reciprocating the carrier 79 with the piercing members or sleeves 81 can include a discrete second drive. It is presently preferred to employ a single drive including the shaft 95 for the disc cam 89. Such shaft can be provided with an eccentric 95A which cooperates with one or more springs 95B serving to urge the carrier 79 upwardly and against the eccentric 95A so as to ensure that the carrier 79 will intermittently lift and lower the battery of sleeves 81 relative to the associated plungers 84 and with reference to the row of seed carrying devices 63 at the station 12.

When the insertion of one or more seeds 2 into the illustrated seed carrying device 63 is completed, the spring or springs 95B cause the carrier 79 to rise with the sleeve 81 while the plunger 84 remains in the illustrated position so that the lower end portion 82 of the sleeve is extracted from the device 63 but the seeds 2 and the material of the device 63 cannot share such upward movement. The spring 90 thereupon cooperates with the rotating disc cam 89 to lift the plunger 84 after the lower end portion 82 of the sleeve 81 has been lifted above the device 63. The operation is then repeated as soon as the next row of seed carrying devices 63 reaches the seed dischargihg station 12, i.e., the carrier 79 descends with the sleeves 81 whose lower end portions 82 penetrate into the aligned carrying devices 63, the plungers 84 are caused to rise from levels below to levels above the respective inlets 86 so as to allow one or more seeds 2 to descend into the holes made by the lower end portions 82 of the respective sleeves 81, the plungers 84 are thereupon caused to descend into the respective devices 63, and the carrier 79 is then lifted with the sleeves 81 ahead of renewed upward movement of the plungers 84.

Figure 3:
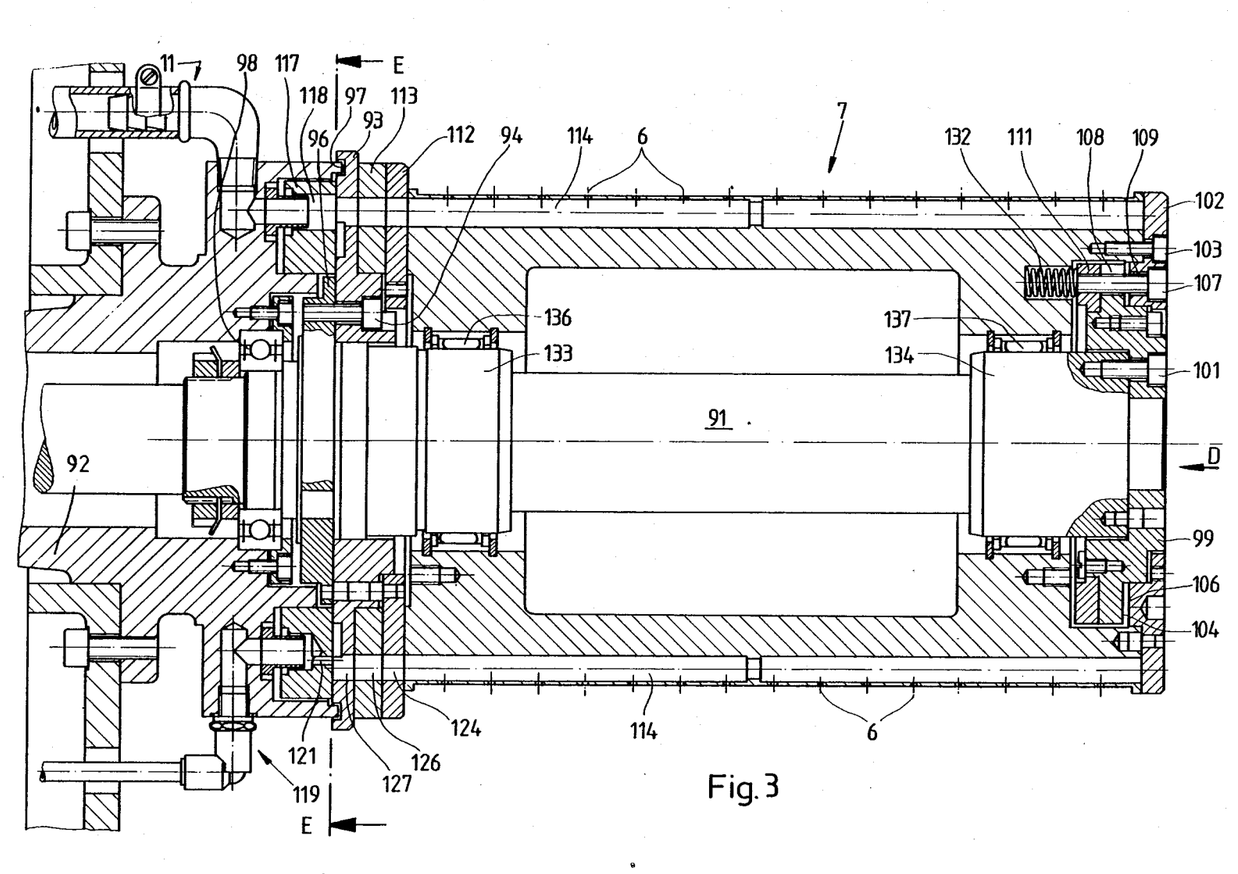
FIG. 3 is an enlarged axial sectional view of a rotary drum-shaped conveyor in the apparatus which is shown in FIG. 1 and of a selector which is operated to convert the apparatus from delivery to each inserting device of single seeds to delivery of clusters of two or more seeds, or vice versa.

FIG. 3 illustrates one presently preferred embodiment of the conveyor 4 and of the means for connecting selected rows of ports 6 with the suction generating device 11A. The shell 7 is formed with ten axially parallel rows R1 of suction ports 6 having a first size, with ten axially parallel rows R2 of suction ports having a different second size, with ten axially parallel rows R3 of suction ports 6 having a different third size, and with ten axially parallel rows R4 of suction ports 6 having a different fourth size. The ten rows R1 form a first group, the ten rows R2 form a second group, and so forth. The mutual spacing of neighboring rows is 9° (see FIG. 4). The means for connecting selected individual groups of rows R1, R2, R3 or R4, or selected pairings of groups with the suction generating device 11A are adjacent to the two axial ends of the conveyor 4 and enable an operator to select ports 6 having appropriate dimensions for proper reception of relatively small, medium-sized or large seeds 2 as well as to select pairs of rows of ports for delivery of a cluster of seeds into each of the seed carrying devices 61. If the connecting means is set to connect the suction generating device 11A only with the group of rows R1, R2, R3 or R4, the apparatus is set to admit a single seed 2 into each of the seed carrying devices 63 at the seed discharging station 12 below the shell 7 of the conveyor 4. If the apparatus is set to connect the device 11A with pairs of neighboring rows (e.g., R1 and R4) belonging to different groups, the conduits 71 admit a pair of seeds 2 into each of the seed carrying devices 63 at the station 12 (see FIG. 2).

The means for transmitting torque from the prime mover 8 to the conveyor 4 comprises a driver shaft 91 which is coaxial with and is spacedly surrounded by the shell 7. The shaft 91 further extends through a stationary part or support 92 which can constitute an element of the frame 68. That end portion of the shaft 91 which is located to the left of FIG. 3 carries a pulley, a sprocket wheel or a gear (not shown) which is driven by the output element of the prime mover 8, e.g., through the medium of a toothed belt, a chain or a gear. The shaft 91 has a flange 96 which is affixed to a sealing ring 93 by a set of screws 94 or analogous fasteners. The sealing ring 93 is adjacent to the respective axial end of the shell 7. The means for biasing the shell 7 axially toward the sealing ring 93 is disposed at the other axial end of the conveyor 4.

The sealing ring 93 and the shell 7 rotate as a unit when the ring 93 is driven by the flange 96 of the shaft 91, and the ring 93 cooperates with the stationary part 92 to define a labyrinth seal 97 serving to prevent uncontrolled inflow of atmospheric air and/or contaminants into the interior of the conveyor 4. The shaft 91 is journalled in the stationary part 92 at two axially spaced-apart locations and rotates in two antifriction ball bearings 98 (only one of these bearings can be seen in FIG. 3).

The means for releasably coupling the shaft 91 to the shell 7 of the conveyor is shown in the right-hand portion of FIG. 3 and comprises two coaxial ring-shaped coupling members 99 and 102. The inner coupling member 99 is secured to the adjacent end portion of the shaft 91 by screws or bolts 101. The outer coupling member 102 is secured to the adjacent end portion of the shell 7 by screws, bolts or analogous fasteners 103. One of the coupling members 99, 102 has at least one circumferentially complete recess or groove 104 for the complementary ring-shaped sealing rib or ribs 106 of the other coupling member. The coupling members 99, 102 are biased axially against each other by tensioning means including a set of screws 107 and a ring-shaped retainer 111 having tapped bores for the shanks of the screws 107. The coupling members 99 and 102 are clamped between the heads of the screws 107 and the retainer 111. The shanks of the screws 107 extend through untapped bores or holes 109 of the ring-shaped inner coupling member 99 and through similar untapped bores or holes 108 of the outer coupling member 102. The extent to which the coupling members 99, 102 are biased against each other depends on the extent to which the shanks of the screws 107 are driven into the respective tapped bores of the retainer 111. The force with which the left-hand axial end of the shell 7 (as viewed in FIG. 3) is urged toward the sealing ring 93 depends on the force with which the coupling members 99, 102 are clamped against each other.

Figure 5:
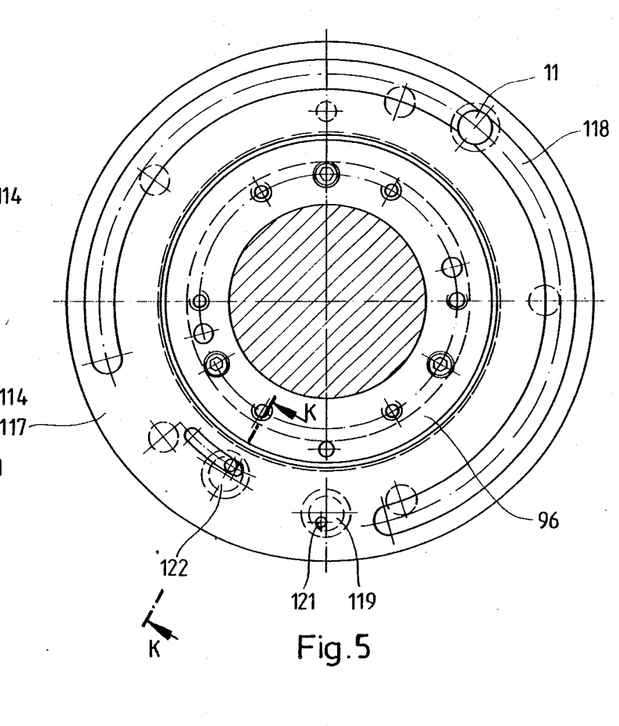
FIG. 5 is a sectional view as seen in the direction of arrows from the line E—E of FIG. 3.

The means for connecting selected rows of ports 6 in the shell 7 with the suction generating device 11A comprises a ring-shaped selector 113 which is disposed between the sealing ring 93 and a ring-shaped member 112. The latter is in direct contact with the respective end of the shell 7 and has a plurality of axially parallel openings 124 in the form of circular holes each of which registers with one of forty equidistant axially parallel channels 114 in the shell 7. Each of the channels 114 communicates with one row R1, R2, R3 or R4 of suction ports 6. The angular spacing between the axes of neighboring channels 114 is the same as the angular spacing between the centers of suction ports 6 in neighboring rows R1-R2, R2-R3, R3-R4 or R4-R1 (as considered in the circumferential direction of the conveyor 4), i.e., such angular spacing is 9°. The intake 11 of the suction generating device 11A is affixed to the stationary part 92 and is in communication with an arcuate groove 118 (see also FIG. 5) of a substantially ring-shaped valving element or valve plate 117 which is disposed between the sealing ring 113 and the stationary part 92 and is affixed to the part 92. Air which is to be drawn from selected ports 6 (in order to attract seeds 2 into such selected ports) must flow from the ports 6, through the respective channels 114 of the shell 7, through the respective openings 124 of the ring-shaped member 112, through the respective openings 126 of the selector 113, through the respective openings 127 of the sealing ring 93, through the groove 118 of the valving element 117, and into the intake 11 on the stationary part 92. Thus, the streams of air which are drawn into selected suction ports 6 must flow through the corresponding channels 114 and through the components 112, 113, 93, 117 on their way into the suction generating device 11A.

Figure 10:
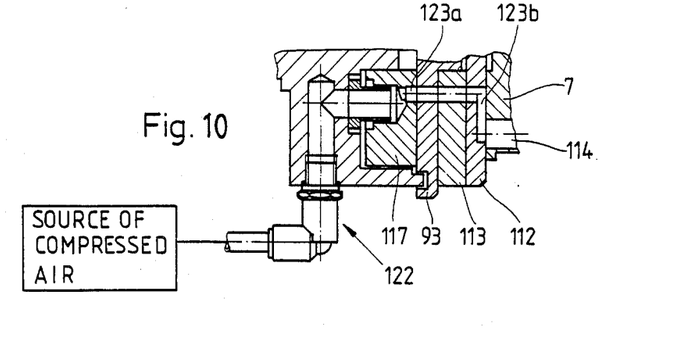
FIG. 10 is an enlarged fragmentary sectional view as seen in the direction of arrows from the line K—K of FIG. 5.

That portion of the valving element 117 which is disposed between the ends of the arcuate groove 118 is formed with two compressed air outlets 119 and 122 connected to a compressed air source (FIG. 10). The outlet 119 can admit compressed air to a small-diameter bore 121 which admits some compressed air into successive channels 114 of the shell 7 at the time such channels are adjacent to the seed discharging station 12. Thus, the streams of compressed air assist the force of gravity in ensuring that the seeds 2 which are confined in the respective ports 6 on their way from the magazine 1 to the station 12 are compelled to enter the respective flexible conduits 71 and to advance into the sleeves 81 of the respective seed inserting devices 61. A channel 114 which is located at the station 12 is sealed from the intake 11.

The compressed air outlet 122 of the valving element 117 admits compressed air into successive channels 114 downstream of the seed discharging station 12 in order to expel dust and/or other contaminants before the respective ports 6 reach the magazine 1. The connection between the compressed air outlet 122 and successive channels 114 of the shell 7 comprises a composite passage or channel including a first channel or groove 123a in the stationary valving element 117 and composite second channels or passages 123b which communicate with the channel or groove 123a and are provided in the sealing ring 93, selector 113 and ring-shaped member 112 (see FIGS. 5 and 10), one for each of the channels 114.

The number of differently dimensioned suction ports 6 in the shell 7 can be reduced to two or three or increased to five or more. This would entail a corresponding reduction or increase of the total number of channels 114 in the shell 7. It has been found that the versatility of the improved apparatus is sufficiently pronounced if the shell 7 has four groups of differently dimensioned suction ports and each group includes plural rows of axially parallel ports. Furthermore, the angular spacing between the neighboring rows of ports 6 can be reduced to less or increased to more than 9°. The arrays of four neighboring rows R1, R2, R3, R4 are repeated ten times, i.e., the shell 7 has ten channels 114 each of which communicates with a discrete row R1 (each row R1 can contain the smallest ports 6), ten channels 114 each of which communicates with a discrete row R2 (each row R2 can contain ports 6 which are slightly larger than the ports of a row R1), ten channels 114 each of which communicates with a discrete row R3 (each row R3 can contain ports 6 which are somewhat smaller than the ports of a row R2), and ten channels 114 each of which communicates with a discrete row R4 (each row R4 can contain suction ports 6 which are somewhat larger than the ports 6 of a row R1).

Figure 4:
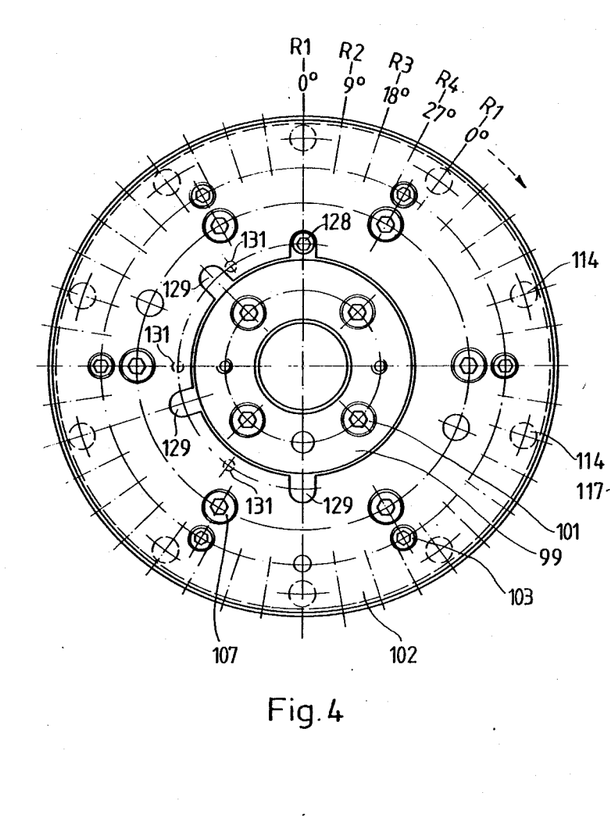
FIG. 4 is an end elevational view of the conveyor as seen in the direction of arrow D in FIG. 3.

When the apparatus is set to supply a single seed 2 into each of the seed carrying devices 63 at the discharging station 12, the angular position of the selector 113 of the connecting means is chosen in such a way that only each fourth channel 114 (as considered in the circumferential direction of the shell 7) is permitted to communicate with the suction intake 11 during each revolution of the conveyor 4. In other words, the suction intake 11 will communicate with ten rows R1, ten rows R2, ten rows R3 or ten rows R4 during each revolution of the conveyor 4, and the intermittent movements of the conveyor 64 for the trays 62 are synchronized with the rotary movement of the conveyor 4 to ensure that the sleeve 81 of each inserting device 61 will contain one seed 2 at the time a fresh row of seed carrying devices 63 is ready to receive seeds at the station 12. FIG. 4 shows that the row R1 at the apex of the shell 7 is in communication with the intake 11 of the suction generating device 11A. Thus, and as further shown in FIG. 3, the just mentioned row R1 communicates with the suction generating device 11A by way of the corresponding channel 114, the opening 124 which is provided in the ring-shaped member 112 and communicates with such channel 114, the opening 126 which is provided in the selector 113 and communicates with such opening 124, the opening 127 which is provided in the sealing ring 93 and communicates with such opening 126, and the groove 118 of the stationary valving element 117. The remaining nine rows R1 of suction ports 6 in the shell 7 are also free to communicate with the suction intake 11 but the rows R2, R3 and R4 are then sealed from the suction generating device 11A. Each of the components 112, 113, 93 has ten openings 124, 126, 127, respectively, for the ten rows R1 of smallest ports 6. Such openings 124, 126, 127 (which register with the respective axial ends of the channels 114 adjacent to the rows R1) are spaced apart by angles of 36°, as considered in the circumferential direction of the conveyor 4.

If the apparatus is to be adjusted so as to enable the rows R2 or R3 or R4 of ports 6 to attract and advance seeds 2 from the magazine 1 to the discharging station 12, the selected rows R2, R3 or R4 must be caused to assume the positions occupied in FIGS. 3 and 4 by the rows R1, i.e., the conveyor 4 must be rotated relative to the shaft 91 of the torque transmitting means and/or vice versa. This is accomplished by loosening the screws 107 so as to relax the clamping action upon the ring-shaped coupling members 99 and 102, and the operator also removes a marker or index in the form of a screw 128 (FIG. 4) before the shell 7 and the coupling member 102 are rotated through 9° (in order to activate the rows R2), through 18° (in order to activate the rows R3) or through 27° (in order to activate the rows R4). The screws 107 are thereupon reapplied so as to ensure that the angular position of the shell 7 relative to the shaft 91 cannot be changed accidentally when the apparatus is in use.

The marker 128 is thereupon inserted into a different tapped bore 131 of the coupling member 99 so that its head is received in a different cutout 129 of the coupling member 102. Coil springs 132 in suitable blind bores of the shell 7 serve to bias the retainer 111 in a direction away from the ring-shaped member 112 and to thus urge the shell 7 toward the member 112 so as to ensure that the shell can be rotated relative to the shaft 91 in response to loosening of the screws 107 but that no gaps are formed between the member 112 and the selector 113 and/or between the selector 113 and the sealing ring 93 while the operator changes the angular position of the shell 7 relative to the shaft 91 (in order to select the rows R1, R2, R3 or R4 for transfer of seeds 2 from the magazine 1 to the discharging station 12) or to change the angular position of the selector 113 relative to the ring-shaped member 112 and sealing ring 93. The absence of gaps between the components 112, 113, 93 during a change in the angular position of the shell 7 relative to the shaft 91 reduces the likelihood of penetration of dust and/or other contaminants into the channels 114 of the shell while the apparatus is being set up for a different mode of operation, either for selection of a different group of rows for reception of seeds in their respective ports 6 or for admission of one or two seeds into each of the seed carrying devices 63. In order to facilitate the turning of the shell 7 relative to the shaft 91, the latter has two axially spaced apart bosses 133, 134 which are surrounded by needle bearings 136, 137. These needle bearings are used only when the screws 107 are loosened for the purpose of enabling the operator to turn the shaft 91 relative to the shell 7 and/or vice versa.

The admission of several seeds 2 into one and the same seed carrying device 63 is desirable or necessary for the growing of certain types of plants. This is achieved by changing the angular position of the selector 113 relative to the ring-shaped member 112 and sealing ring 93. The ring-shaped member 112 is formed with ten additional openings 124, the selector 113 is formed with ten additional openings 126, and the sealing ring 93 is formed with ten additional openings 127. The openings 124, 126 and 127 are respectively disposed in pairs so that each such pair is in accurate register with two neighboring channels 114 of the shell 7 when the apparatus is set to deliver pairs of seeds 2. The selector 113 can be moved between two angular positions in one of which each pair of its openings 126 registers with the adjacent pairs of openings 124, 127 and in the other of which only one of each pair of openings 126 registers with an opening 124 and an opening 127. The angular spacing between the centers of each pair of neighboring openings 124, 126 and 127 is 9°, i.e., the same as between the axes of two neighboring channels 114 in the shell 7. When the apparatus is set for admission of a single seed 2 into each of the seed carrying devices 63, the angular position of the selector 113 is such that only ten of its openings 126 register with the adjacent openings 124 and 127. When the apparatus is adjusted to admit pairs of seeds 2 into each of the seed carrying devices 63, each opening 126 of the selector 113 is in register with a discrete opening 124 as well as with a discrete opening 127. The arrangement can be such that, when the apparatus is ready to admit pairs of seeds 2 into seed carrying devices 63, the seeds are delivered thereto by pairs of neighboring rows R1, R4 or R4, R3 or R3, R2, depending on the dimensions of the ports 6 which form the rows R1, R2, R3 and R4.

It will be noted that the conversion from admission of single seeds to admission of pairs of seeds is very simple and takes up little time. All that is necessary is to turn the selector 113 through an angle of 9° with reference to the adjacent ring-shaped member 112 and sealing ring 93. This activates selected ten channels 114 (rows R1, R2, R3 or R4) or selected twenty channels 114 (pairs of neighboring rows R1, R4 or R4, R3 or R3, R2). The screws 107 are slightly loosened prior to turning of the selector 113 relative to the ring-shaped member 112 and sealing ring 93.

Figures 6A, 6B:
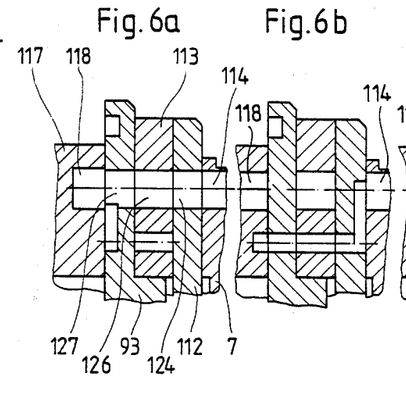
FIGS. 6a to 6d are fragmentary axial sectional views of the conveyor while the selector is held in a position for delivery of a single seed to each of the inserting devices.
Figure 6C:
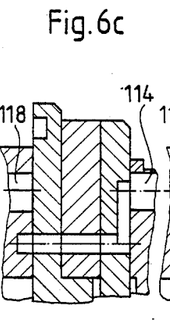
Figure 6D:
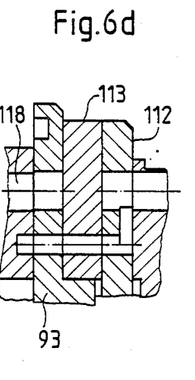

FIGS. 6a to 6d show portions of the shell 7, ring-shaped member 112, selector 113, sealing ring 93 and valving element 117 in the planes including the axis of the shell 7 and the centers of the rows R1, R2, R3 and R4 at the top of FIG. 4. The selector 113 is set for admission of a single seed 2 into each of the seed carrying devices 63 which arrive at the seed discharging station 12 of FIG. 1. FIG. 6a shows that the groove 118 of the valving element 117 (and hence the intake 11 of the suction generating device 11A) is free to communicate with the ports 6 of the row R1 by way of the corresponding channel 114 and the registering openings 124, 126, 127. FIG. 6b shows that the channel 114 which is adjacent to the row R2 cannot communicate with the groove 118 because the member 112 and the ring 93 seal the flow of air from the channel 114 to the groove 118. FIG. 6c shows that the channel 114 which is adjacent to the row R3 cannot communicate with the groove 118 because the flow of air is prevented by the member 112, selector 113 and ring 93. Finally, FIG. 6d shows that the channel 114 which is adjacent to the row R4 is also prevented from communicating with the groove 118 because the flow of air is blocked by the selector 113.

Figures 7A, 7B, 7C:
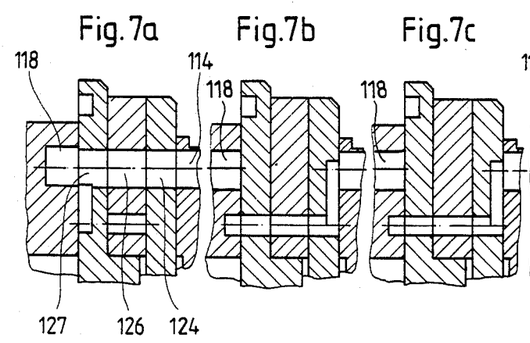
FIGS. 7a to 7d are similar fragmentary axial sectional views of the conveyor while the selector is set for delivery of a pair of seeds to each of the inserting devices.
Figure 7D:
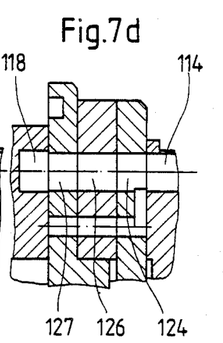

FIGS. 7a to 7d show the mutual positions of the selector 113 on the one hand and the shell 7, ring-shaped member 112 and sealing ring 93 on the other hand when the apparatus is ready to admit a pair of seeds 2 into each of the seed carrying devices 63 at the discharging station 12. The row R1 of ports 6 is adjacent to the channel 114 which is shown in FIG. 7a, and such channel is free to communicate with the groove 118 by way of the registering openings 124, 126, 127. The row R2 which is adjacent to the channel 114 of FIG. 7b is sealed from the groove 118, the same as the row R3 which is adjacent to the channel 114 of FIG. 7c. The row R4 which is adjacent to the channel 114 of FIG. 7d is free to communicate with the groove 118 of the valving element 117 by way of the respective openings 124, 126, 127 in the ring-shaped member 112, selector 113 and sealing ring 93, respectively. The sections of FIGS. 7a to 7d respectively correspond to those of FIGS. 6a to 6d except that the selector 113 is turned through an angle of 9°.

Figure 8:
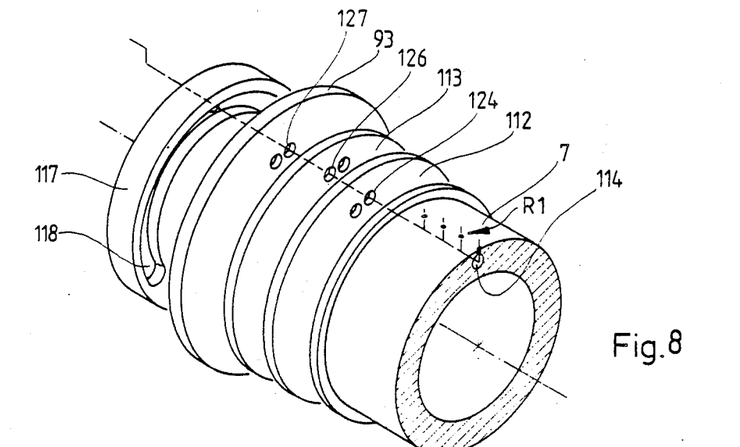
FIG. 8 is a fragmentary exploded perspective view of the conveyor and of certain other components of the apparatus, with the selector in the angular position of FIGS. 6a to 6d.
Figure 9:
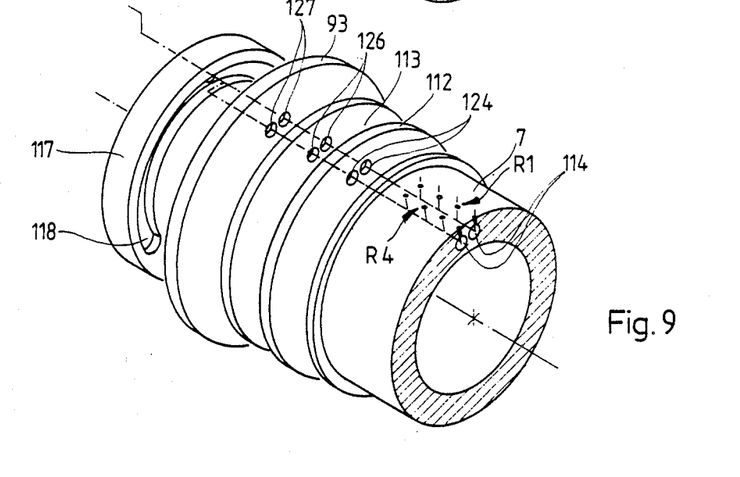
FIG. 9 is a similar fragmentary exploded perspective view but showing the selector in the angular position of FIGS. 7a to 7d.

The positions of the shell 7, ring-shaped member 112, selector 113 and sealing ring 93 with reference to the valving element 117 of FIG. 8 correspond to the positions of these parts in FIGS. 6a to 6d. Thus, the channel 114 which is adjacent to and communicates with a row R1 of ports 6 in the shell 7 is free to communicate with the arcuate groove 118 of the valving element 117 by way of the registering openings 124, 126, 127. It will be seen that only one of the illustrated pair of neighboring openings 126 in the selector 113 registers with the adjacent openings 124, 127. If the selector 113 is then turned to the position of FIG. 9 (corresponding to the positions shown in FIGS. 7a to 7d), each pair of neighboring openings 126 therein registers with a pair of openings 124 as well as with a pair of openings 127 so that pairs of neighboring channels 114 in the shell 7 are free to communicate with the groove 118 of the valving element 117. The apparatus is then ready to dispense pairs of seeds 2 into the seed carrying devices 63 at the station 12. It will be recalled that the shell 7 has a total of forty axially parallel channels 114, that the ring-shaped member 112 and the sealing ring 93 each have twenty openings 124, 127, that the selector 113 has twenty openings 126 and that the selector is movable between a first position in which only ten of its openings 126 register with the adjacent openings 124, 127 (FIG. 8 and FIGS. 6a-6d) and a second position (FIGS. 7a-7d and FIG. 9) in which each of its twenty openings 126 is in register with a discrete opening 124 as well as with a discrete opening 127.

As also mentioned above, the ports 6 of the row R1 are preferably larger or smaller than the ports of the rows R2, R3 and R4, and the same preferably applies for the ports of the rows R2, R3 and R4. Therefore, when the apparatus is set to deliver pairs of seeds 2 into the carrying devices 63 at the station 12, seeds which may be of identical size will be carried in pairs of rows (such as R1 and R4) of ports 6 having different sizes. This does not unduly affect the reliability of transport of seeds because the differences between the sizes of ports in neighboring rows need not be very pronounced or the pairings can be selected in such a way that seeds are transported in neighboring rows whose ports have similar dimensions. In fact, it is possible to provide the shell 7 with groups of rows having ports of identical size. For example the ports 6 of the rows R1 can be the same as the ports of the rows R2, and the ports of the rows R3 can be the same as those of the rows R4. It is further to be borne in mind that the seeds of the same type often vary in size so that the utilization of neighboring rows with ports of two different sizes does not create any problems as regards the reliability of transport of such seeds from the magazine 1 to the conduits 71 at the station 12. All that counts is to ensure that the seeds 2 do not penetrate into the respective channels 114 because this could result in clogging of the paths for the flow of air from the ports to the suction generating device 11A.

It is further within the purview of the invention to design the apparatus in such a way that it can admit into each carrying device 63 a single seed 2, two seeds or three or more seeds. All that is necessary is to redesign the selector 113 so that it is provided with a total of thirty openings 126 (the member 112 is then formed with thirty openings 124 and the ring 93 is then formed with thirty openings 127) and is movable between three different angular positions in one of which the apparatus is operated in a manner as shown in FIGS. 6a-6d and FIG. 8 (each device 63 receives a single seed), in another of which each device 63 receives two seeds (see FIGS. 7a-7d and FIG. 9) and in the third of which each device 63 receives three seeds (the selector 113 then allows sets of three neighboring channels 114 to communicate with the groove 118 of the valving element 117). By the same token, the apparatus can be designed to admit four or more seeds into each of the seed carrying devices at the station 12.

An important advantage of the improved apparatus is its pronounced versatility. Thus, the apparatus can be used for the transport and implantation of relatively small seeds, medium-sized seeds or larger seeds. Furthermore, the apparatus can be used for implantation of single seeds or clusters of several seeds. All this can be accomplished with one and the same rotary drum-shaped seed transporting conveyor. The singularizing action of the improved apparatus is highly satisfactory.

Another important advantage of the improved apparatus is that it can automatically implant discrete seeds or clusters of several seeds into discrete rod-shaped seed carrying devices or directly into larger receptacles which contain soil, artificial soil or any other material which is suitable for germination and sprouting of seeds. The operation of the battery of seed inserting devices 61 can be readily synchronized with that of the remaining parts of the apparatus so as to ensure a highly predictable and uniform implantation of seeds at the station 12.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting seeds, comprising a drum-shaped conveyor rotatable about a predetermined axis and having a plurality of suction ports for reception of discrete seeds, said ports orbiting along an endless path in response to rotation of the conveyor, said ports being disposed in a plurality of rows and said rows forming at least two groups of rows one of which has first ports and the other of which has second ports larger than said ports, said conveyor having channels each of which communicates with a row of ports; a source of seeds adjacent to a portion of said path; a suction generating device; and means for connecting said device with selected ports so that only the selected ports attract seeds during travel past said source, said connecting means including means for establishing communication between said device and selected ones of said channels during each revolution of said conveyor, said means for establishing communicationn comprising a substantially ring-shaped selector having openings movable into and from register with selected channels of said conveyor.

2. The apparatus of claim 1, wherein said rows are parallel to said predetermined axis.

3. The apparatus of claim 1, wherein said conveyor has first and second end portions and said connecting means is adjacent to one end portion of said conveyor.

4. The apparatus of claim 1, wherein said selector has several sets of openings and is movable with reference to said conveyor between a first angular position in which the openings of one of said sets register with channels communicating with the ports of one of said groups and a second angular position in which the openings of two of said sets register with channels communicating with the ports of two different groups.

5. The apparatus of claim 4, wherein said connecting means further comprises a substantially ring-shaped member having a discrete opening for each channel in communication with the ports of said two different groups and each in register with the respective channel, said member being coaxial with said selector and the latter being rotatable relative to said member between said first and second positions thereof.

6. The apparatus of claim 4, wherein said connecting means further comprises a valving element adjacent to said selector and having a groove communicating with said device, said groove being in communication with the openings of at least one set of openings in said selector during a predetermined stage of each revolution of said selector.

7. The apparatus of claim 6, further comprising a stationary support for said valving element and a shaft for rotating said selector and said conveyor.

8. The apparatus of claim 1, further comprising means for transmitting torque to said conveyor, including a shaft coaxial with said conveyor, a first coupling member affixed to said shaft, a second coupling member affixed to the other end portion of said conveyor, and means for separably securing said coupling members to each other.

9. The apparatus of claim 8, wherein said coupling members include rings.

10. The apparatus of claim 8, wherein said securing means comprises screws and a retainer mating with said screws, said screws having heads and said coupling members being clamped between said heads and said retainer.

11. The apparatus of claim 1, further comprising means for transmitting torque to said conveyor and means for separably coupling said torque transmitting means to said conveyor so as to allow for changes in the angular position of said conveyor relative to said torque transmitting means.

12. The apparatus of claim 11, wherein said coupling means is adjacent to one axial end of said conveyor and said connecting means is adjacent to the other axial end of said conveyor, said connecting means having means for connecting said device with the ports of at least one of said groups in response to separation of said conveyor from said torque transmitting means.

13. The apparatus of claim 12, further comprising means for biasing said conveyor axially against said connecting means.

14. The apparatus of claim 1 for implantation of seeds into seed carrying devices, wherein said path has a second portion where the seeds are discharged from the respective ports and further comprising means for transporting arrays of seed carrying devices to said second portion of said path and means for inserting the discharged seeds into the seed carrying devices.

15. Apparatus for transporting seeds, comprising a rotary drum-shaped conveyor having a plurality of suction ports for reception of discrete seeds, said ports orbiting along an endless path in response to rotation of the conveyor, said ports being disposed in a plurality of rows and said rows forming at least two groups of rows one of which has first ports and the other of which has second ports larger than said first ports, said conveyor having a plurality of channels each communicating with a discrete row of suction ports; a source of seeds adjacent to a portion of said path; a suction generating device; means for connecting said device with selected ports so that only the selected ports attract seeds during travel past said source; and a stationary valving element having a groove in communication with said suction generating device and disposed at one axial end of said conveyor, said connecting means comprising a sealing ring adjacent to said valving element and a selector disposed between said sealing ring and said one axial end of said conveyor, said selector and said ring having openings and the openings of said ring communicating with said groove and being aligned with selected channels of said conveyor, said selector and said ring being rotatable with said conveyor and said selector being further rotatable relative to said ring and said conveyor to place at least some of its openings into register with the openings of said ring and with the respective channels.

16. The apparatus of claim 15, further comprising a source of compressed air, said valving element having a compressed air outlet connected to said source of compressed air and arranged to admit compressed air into successive channels by way of said ring and said selector while such channels advance along a second portion of said path so as to promote the expulsion of seeds from the respective ports while the ports advance along said second portion of said path.

17. The apparatus of claim 15, further comprising a source of compressed air, said valving element having a compressed air outlet connected to said source of compressed air and arranged to admit compressed air into successive channels by way of said ring and said selector before such channels reach said portion of said path so as to clean the channels and the respective ports before the ports reach said source of seeds.

18. Apparatus for transporting seeds for implantation of seeds into seed carrying devices, comprising a rotary drum-shaped conveyor having a plurality of suction ports for reception of discrete seeds, said ports orbiting along an endless path in response to rotation of the conveyor, said ports being disposed in a plurality of rows and said rows forming at least two groups of rows one of which has first ports and the other of which has second ports larger than said first ports; a source of seeds adjacent to a first portion of said path, said path having a second portion where the seeds are discharged from the respective ports; a suction generating device; means for connecting said device with selected ports so that only the selected ports attract seeds during travel past said source; means for transporting arrays of seed carrying devices to said second portion of said path; and means for inserting the discharged seeds into the seed carrying devices, comprising a discrete inserting unit for each port of a row and each unit comprising a tubular piercing member, means for forcibly introducing the piercing member into and for withdrawing it from a seed carrying device in the second portion of said path, means for admitting at least one seed into the piercing member so that the seed enters the respective seed carrying device, and means for retaining the thus inserted seed in the seed carrying device during extraction of the piercing member.

19. The apparatus of claim 18, wherein each piercing device includes an upright sleeve having a pointed lower end portion to facilitate its penetration into a seed carrying device.

20. The apparatus of claim 18, wherein each of said retaining means comprises a plunger and further comprising means for reciprocating said plungers with reference to the respective piercing members.

21. The apparatus of claim 20, wherein each of said piercing members has an inlet for introduction into its interior of seeds which are supplied by said admitting means, said plungers being arranged to block the introduction of seeds into the respective piercing members in predetermined positions of such plungers relative to the corresponding piercing members.

* * * * *